W. H. RAY.
GEARING.
APPLICATION FILED OCT. 25, 1910.

996,426.

Patented June 27, 1911.

2 SHEETS—SHEET 1.

Witnesses

Inventor
Wm. H. Ray
By Wm. Moore
Attorney

THE NORRIS PETERS CO., WASHINGTON, D. C.

W. H. RAY.
GEARING.
APPLICATION FILED OCT. 25, 1910.
996,426.
Patented June 27, 1911.
2 SHEETS—SHEET 2.
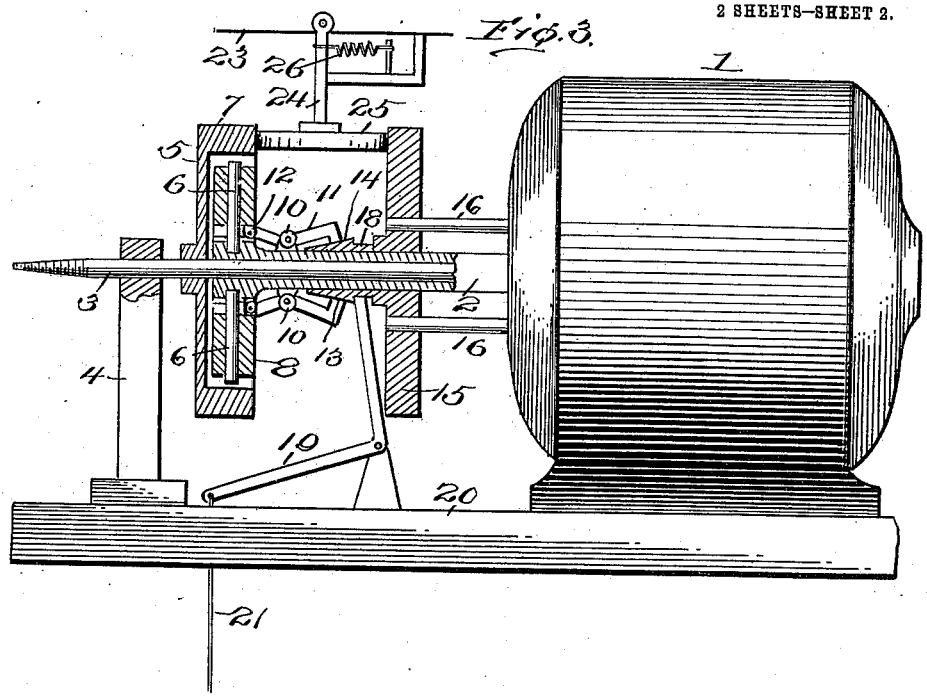
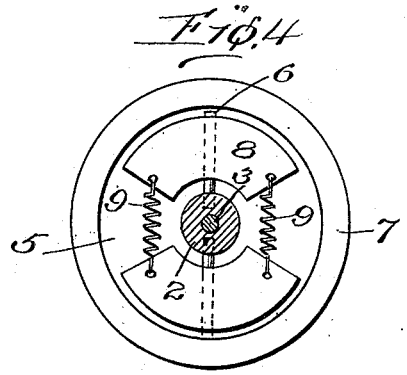
Witnesses
J. M. Fowler Jr.
M. E. Moore
Inventors
Wm. H. Ray
By Wm. N. Moore
Attorneys

UNITED STATES PATENT OFFICE.

WILLIAM HENRY RAY, OF HEREFORD, TEXAS.

GEARING.

996,426.

Specification of Letters Patent. Patented June 27, 1911.

Application filed October 25, 1910. Serial No. 589,078.

*To all whom it may concern:*

Be it known that I, WILLIAM HENRY RAY, a citizen of the United States, residing at Hereford, in the county of Deaf Smith and State of Texas, have invented certain new and useful Improvements in Gearing, of which the following is a specification.

My invention relates to improvements in gearing, and has particular reference to an improved form of gearing for use upon jewelers' lathes or buffing machines.

The leading object of my invention is the provision of a gearing adapted for light work which shall be simple of construction and shall be readily operable to reverse the movement of the driven shaft, and which gearing will serve to first brake the said shaft without in any manner impairing the efficiency of the gearing.

A further object of the invention is the provision of an improved form of friction gearing in which a single shell pulley or wheel secured on the driven shaft serves to transmit thereto both the forward and reverse driving force.

To attain the desired objects, my invention comprises a centrifugal friction clutch, and means for throwing said clutch out of operation and connecting with the shell pulley of said clutch direct frictional gearing for driving the shell in the opposite direction, the invention further residing in the novel features of construction and combination and arrangement of parts substantially as described in the following specification and as illustrated in the accompanying drawings forming a part thereof.

Figure 1:
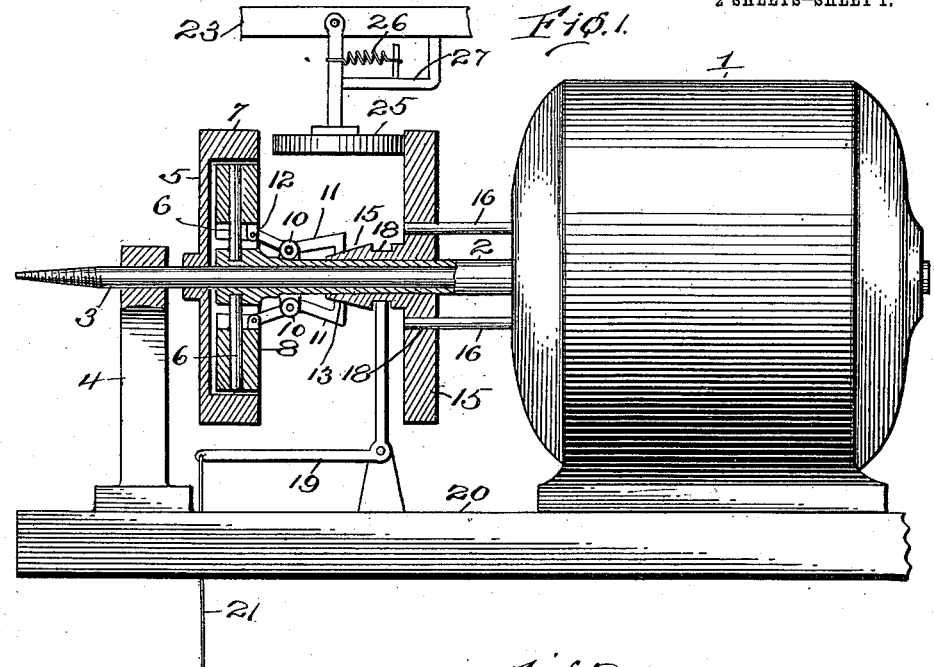
Figure 2:
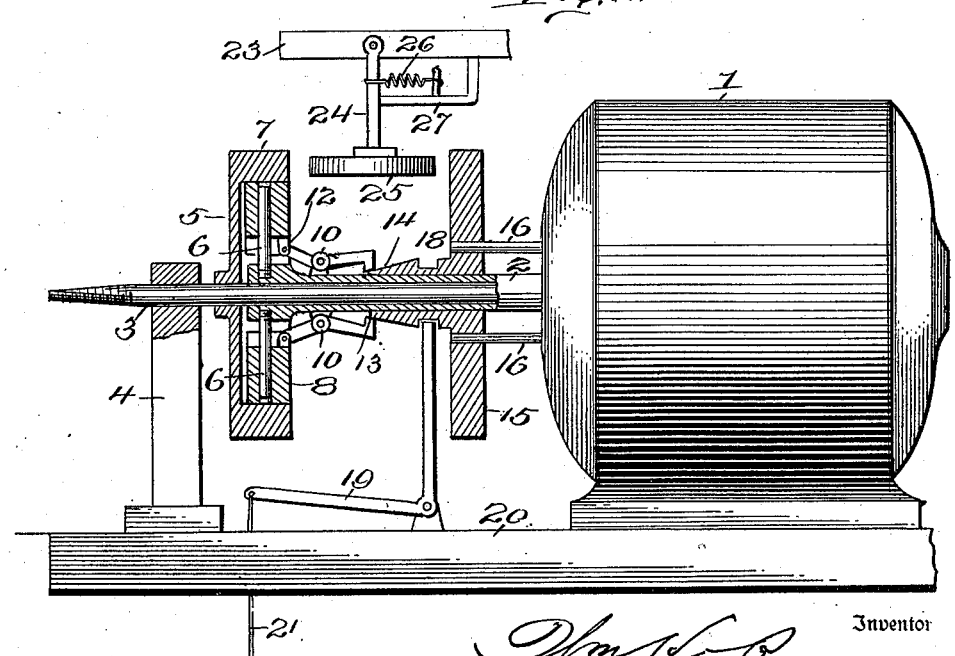

Figure 1 represents a side elevation of a motor with my improved gearing applied thereto, the centrifugal clutch being shown in section, and the parts being in neutral position. Fig. 2 represents a similar view with the centrifugal or direct driving clutch in operative position. Fig. 3 represents a similar view with the centrifugal clutch in neutral and the reverse clutch in operative position, and, Fig. 4 represents an end view of the device, the disk of the shell pulley being removed and the rim shown in section.

In the drawings, in which similar characters of reference are employed to denote corresponding parts in the several views, the numeral 1 designates the motor, said motor having projecting from one side the tubular shaft 2 through which passes the solid shaft 3, said latter shaft being supported by the bearings 4 and having secured thereon in any ordinary manner the shell pulley 5 which extends over the end of the shaft 2. Seated in the outer end of the shaft 2 and projecting radially therefrom are the guide pins or posts 6, said pins extending almost into engagement with the rim 7 of the pulley 5 and have mounted and sliding on the posts the weights 8 which are shown as a pair of segment-shaped members, but it will be understood that this number may vary, a suitable number of guiding posts being provided according to the number of said weights. Connecting the opposite weights are coil springs 9 which hold the weights inward on the shaft 2 until the rate of revolution of said shaft is sufficiently rapid to overcome the tension of the springs, when the weights will be thrown outward into engagement with the rim 7 of the pulley, the centrifugal force causing them to frictionally grip said rim and carry it around with them, thus driving the shaft 3.

It will thus be seen that I have provided a simple gearing which will not go into operation until the motor has gathered power and will then have a mere frictional engagement with the pulley of the driven shaft and will consequently permit of some slipping between the parts and prevent the strain of starting the load coming violently upon the motor while serving to automatically throw the gearing into operation.

To control the operation of the gearing and throw it out of operation when the shaft 2 is rotating I pivotally secure to the ears 10 on said shaft the levers 11 having one end pivoted to the ear 12 of the weight and the other provided with an inclined face 13 to be engaged by the cam or wedge 14 carried by the shifting wheel 15, said member 15 being suitably secured to rotate with the shaft 2, either by the guide rods 16 secured to the armature of the motor as shown and engaged in the passages 17 in the wheel, or by the customary spline and key way.

Formed intermediate the wheel proper and the members 14 is the annular groove 18 in which is engaged one end of the bell crank lever 19 having its angle pivotally secured to the base 20 of the device and having a wire or suitable connection 21 leading to a pedal or other device for shifting the lever on its pivot to throw the member 14 into and out of engagement with the levers 11 to draw the weights out of engagement with the rim of the shell pulley, as shown in Fig. 1.

Pivotally supported by the bracket 23 is the shaft 24 bearing on its lower end the wheel 25 in alinement with the upper portion of the side of the rim of the shell pulley, while drawing the wheel away from the pulley is the heavy spring 26 having one end secured to the shaft 24 and swinging it on its pivot, the other end of the spring being secured to the abutment 27 projecting from the bracket 23 and limiting the movement of the shaft and thus of its wheel. By reference to Fig. 2 it will be seen that when the centrifugal clutch is in operative position the wheel 25 bears against the member 15 and forces it toward the motor and the force of the spring 26 serves to prevent the accidental outward movement of said wheel 15.

The operation of the reversing mechanism is best shown in Fig. 3, from which it will be seen that the movement of the lever 19 serves first through the levers 11 to throw the weights out of engagement with the pulley and then its continued movement forces the wheel 15 against the wheel 25 and swings the latter on its pivotally supported shaft over against the outer face or side of the rim of the pulley 5, serving to frictionally engage the same and operatively connect it with the wheel 15, and as the wheel 15 is constantly driven by the motor, it will drive the wheel 25 and thus cause the pulley to rotate but in the opposite direction to the shaft 2 and consequently in the reverse direction to that in which it is driven by the centrifugal clutch.

From the foregoing description taken in connection with the drawings the construction and operation of my improved clutch will be readily understood and its advantages be fully appreciated and it will be seen that I have provided a strong, simple, durable and efficient clutch for use on buffers or like devices which will automatically operate upon the starting of the motor to drive the shaft bearing the buffer or like device, but which may be readily thrown into neutral position or reversed when it is desired to unscrew and remove the buffer. Ordinarily, it is necessary to stop the motor and unscrew the buffer by hand, but with my device instead of stopping the motor I merely reverse the gearing, when the pressure of the article being polished will unscrew the buffer, and then throwing the centrifugal clutch into operation it serves to screw on the new buffer, saving a great deal of time and energy.

I claim:

1. A gearing, comprising a shell pulley, a centrifugal engaging member adapted to engage the interior thereof to drive the pulley in one direction, and a friction member adapted to engage the side of the pulley to drive the same in the opposite direction, and means for holding either of the members out of operation as desired.

2. The combination with a shaft, weights carried thereby adapted to be forced outward by centrifugal force, of means for driving the shaft, a second shaft, a shell pulley carried thereby so disposed as to be engaged by the weights, a laterally shiftable member secured on the driven shaft, means coöperating therewith for retracting the weights, and means for operatively connecting the said member with the pulley for driving the latter in a reverse direction when the weights are retracted.

3. In driving mechanism, a driving shaft, a second shaft, a shell pulley carried thereby, centrifugal means for operatively connecting the driving shaft with the pulley, an intermediate gear for engaging the pulley, a driving gear engaging said intermediate gear, and means for retracting the centrifugal means and moving the intermediate gear into engagement with the pulley.

4. In driving mechanism, a driving shaft, radially movable centrifugally operated members thereon, a second shaft, a shell pulley thereon engaged by said members, a shifting collar mounted on and driven by the driving shaft, means operated by the shifting of the collar for retracting the said members, and an intermediate gear connecting the collar when so shifted with the pulley for driving the latter.

In testimony whereof I affix my signature, in presence of two witnesses.

WILLIAM HENRY RAY.

Witnesses:
Jas. A. Hughes,
John McLean.

---

Copies of this patent may be obtained for five cents each, by addressing the "Commissioner of Patents, Washington, D. C."